United States Patent [19]

Davis et al.

[11] 3,868,224

[45] Feb. 25, 1975

[54] DISPOSABLE GAS MEASURING PIPET

[75] Inventors: Stuart M. Davis; Dennis R. Tichendorf, both of Madison, Wis.

[73] Assignee: ESB Incorporated, Philadelphia, Pa.

[22] Filed: Nov. 1, 1973

[21] Appl. No.: 411,643

[52] U.S. Cl. ............... 23/259, 23/253 R, 23/254 R, 23/256, 35/18 R, 195/139
[51] Int. Cl. ........................... G01n 7/18, B01l 5/02
[58] Field of Search...... 23/259, 253 R, 254 R, 256, 23/292, 231, 258; 195/127, 139; 35/18 R

[56] References Cited
UNITED STATES PATENTS

| 383,433 | 5/1888 | Bonte | 23/253 R |
|---|---|---|---|
| 940,258 | 11/1909 | Kiely | 23/253 R |
| 1,834,536 | 12/1931 | Schaut | 195/139 |
| 2,649,359 | 8/1953 | Masellis | 23/292 X |

*Primary Examiner*—Morris O. Wolk
*Assistant Examiner*—Arnold Turk

[57] ABSTRACT

An apparatus for measuring the rate of gas formation or consumption in chemical or biological reactions in which a gas is evolved or consumed during the reaction is disclosed. The gas measuring apparatus comprises a glass or plastic pipet with constricted openings at both ends, calibrated to read volume or height, and bent at one end through an angle greater than 90°; a glass or plastic reaction tube, open at one end and sealed at the opposite end and bent at an angle of approximately 90°, thus forming a gas reservoir at the sealed end; and a seal comprising a short length of rubber or plastic tubing fitted over the bent end of the pipet and forced into the open end of the reaction tube.

3 Claims, 1 Drawing Figure

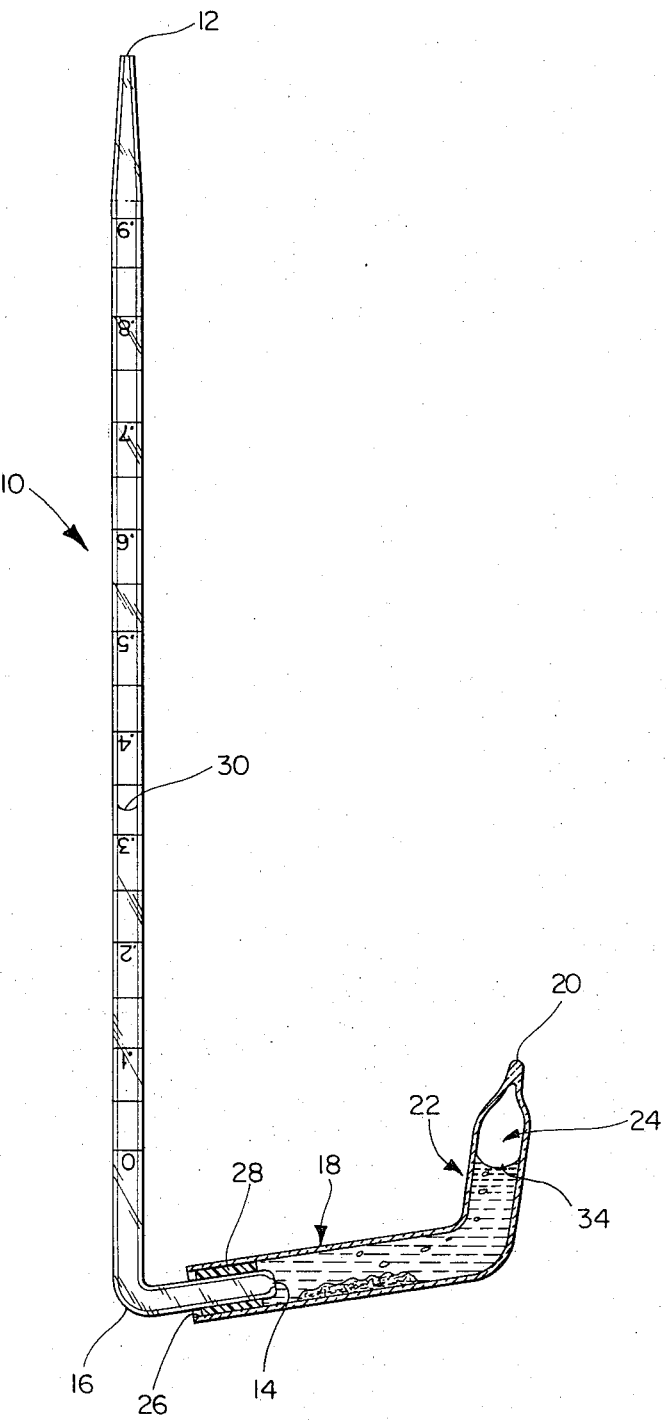

DISPOSABLE GAS MEASURING PIPET

BACKGROUND OF THE INVENTION

1. Field of the Invention

This invention relates to improvements in apparatus for measuring the rate of gas formation or consumption in chemical or biological reactions in which a gas is evolved or consumed during the reaction.

2. Description of the Prior Art

It may be explained here that in many chemical and biological reactions it is desirable to study the rate of gas evolution or consumption for reactions involving a liquid either as a reactant or as the medium for the reaction. Such reactions are commonly studied with regard to fermentation processes, corrosion processes, and chemical stability tests.

At the present time, gas collecting and measuring apparatus are currently available, for example, the so called "fermentation tubes" sold by various scientific supply houses, however, it is believed that none of these offer the combined advantages of high sensitivity, leak tightness, temperature resistance and low cost as are embodied in the apparatus in accordance with the invention.

SUMMARY OF THE INVENTION

Briefly, there is provided a disposable gas measuring apparatus for measuring the rate of gas formation or consumption in chemical or biological reactions. A hollow tubular pipet is provided having calibrations thereon and having constricted openings at the opposite ends thereof. One end portion of the pipet is bent through an angle greater than 90° with respect to the longitudinal axis of the pipet. A hollow reaction tube is provided having an opening at one end thereof and being sealed at the opposite end thereof. The end portion of the reaction tube that is sealed being bent through an angle of approximately 90° with respect to the longitudinal axis of the reaction tube. The end portion of the pipet which is bent being disposed within the opening at the one end of the reaction tube. A seal is provided between the pipet and the reaction tube at the zone of their assembly.

Other features and characteristics of the invention will become apparent from the following description when taken in conjunction with the annexed drawings which form a part of this specification.

BRIEF DESCRIPTION OF THE DRAWING

FIG. 1 diagrammatically illustrates a disposable gas measuring apparatus in accordance with the invention.

DESCRIPTION OF THE PREFERRED EMBODIMENT

Referring now to the drawing there is shown generally at 10 a hollow tubular pipet. The pipet 10 may be constructed of any suitable material, as for example, glass or plastic. The pipet 10 has constricted openings at the opposite upper and lower ends thereof as at 12 and 14 respectively. The pipet 10 is calibrated to read volume or height, and is bent as at 16 through an angle greater than 90° with respect to the longitudinal axis of the pipet 10. A reaction tube is shown generally at 18 which is sealed at one end thereof as at 20, and is bent at an angle of approximately 90° with respect to the longitudinal axis thereof as shown generally at 22. A gas reservoir 24 is formed at the sealed end of the tube 18. The reaction tube 18 may be fashioned of any suitable material such as glass or plastic. As seen in the drawing, the reaction tube 18 has an open end 26 into which a seal 28, comprising a short length of rubber or plastic tubing, is fitted. The seal 28 is located over the lower end of the pipet 10 and is force fitted into the reaction tube 18.

The apparatus as just described is utilized in a study to determine the rate of gas evolution or consumption as follows: Solid reactants, if any, are first weighed and then loaded into the tube 18. Liquid reactants are then introduced so as to entirely fill the tube 18. The short length of rubber or plastic sealing material 28 is slipped onto the lower or bent end of the pipet 10 so that the glass tip of the pipet 10 projects slightly beyond the end of the sealing material 28, and this assembly is then forced into the tube 18. The liquid in the tube 18 acts as a lubricant to facilitate insertion of the assembly of the pipet 10 and seal 28 into the tube 18. As the pipet is inserted, the liquid reactant is forced into the pipet forming a meniscus 30.

When thus assembled, the pipet 10 is then disposed in a vertical position, as is shown in the drawing. A second meniscus will be formed in the tube 18 as gas is generated as is shown at 34.

The pipet 10 must be disposed in a vertical position, as is shown in the drawing, during use to avoid gas, for example, oxygen bubbles coming in contact with the sealing material 28.

Relative movement of the meniscus 30 and the meniscus 34 will indicate to an observer gas formation or consumption depending upon the nature of the reactions being studied.

If it is desired to add a gas into the tube 18 before assembly, this may be accomplished by immersing the tube 18 into the liquid medium used to fill the tube 18 and then bubbling in some gas while holding the gas reservoir 24 vertically so as to collect the gas in the reservoir 24. The pipet 10 with seal 28 disposed thereon is then inserted into the reaction tube 18 while the reaction tube 18 is still immersed in the liquid.

With a disposable serological pipet such as manufactured by the Corning Glass Corporation, Corning No. 7079, a piece of a 9 mm Pyrex tubing serving as the reaction tube 18, and a seal material 28 made of ¼ inch length of ⅛ inch inside diameter by ¼ inch outside diameter amber latex tubing, based on the retail cost of the components and allowing for labor for fabrication, the cost of a complete unit in accordance with the invention is less than $0.20. The gas measuring apparatus of the invention, is, therefore, disposable.

Since only a very small cross-sectional area of the seal 28 is exposed to liquid, seal degradation in the presence of corrosive liquids is minimal. The pipet 10, seal 28 and tube 18 assembly is very resistant to leakage. Both alkaline and acid liquids may be used in this apparatus at temperatures up to 165°F with practically no leakage. The seal is equally tight in an oil or water bath. Since the gas evolved collects in the reservoir 24, which is at a remote location from the seal 28, reactions between gas evolved and the seal are minimized. This is an important feature when an oxidizing gas such as oxygen or chlorine may be evolved. The apparatus in accordance with the invention is sensitive to as little as two microliters of gas. Since the apparatus can be easily assembled with zero air space, sensitivity to temperature fluctuation is minimized.

By way of example, leakage rates of less than five microliters per day have been observed with concentrated sodium hydroxide solutions at 165°F at a full head of electrolyte (approximately 10 inches) and with the lower portions of the pipet 10, including the seal 28, immersed in a hot oil bath.

Having thus described our invention, we claim:

1. A disposable gas measuring apparatus comprising:
    a. a hollow tubular pipet having calibrations thereon and having constricted openings at the opposite ends thereof, one end portion of the pipet being bent through an angle greater than 90° with respect to the longitudinal axis of the pipet;
    b. a hollow reaction tube having an opening at one end thereof and being sealed at the opposite end thereof, the end portion of the reaction tube that is sealed being bent through an angle of approximately 90° with respect to the longitudinal axis of the reaction tube, the said one bent end portion of the pipet being disposed within the opening at the said one open end of the reaction tube; and
    c. a seal located between the pipet and the reaction tube at the zone of their assembly.

2. A disposable gas measuring apparatus as defined in claim 1 wherein the seal is disposed between the outside surfaces of the said one end portion of the pipet and the inside surfaces of the reaction tube which are adjacent to the opening at the said one end of the reaction tube.

3. A disposable gas measuring apparatus as defined in claim 2 wherein said seal comprises a tubular member fitted over the said one end portion of the pipet.

* * * * *